US006917565B2

(12) United States Patent
Kishida

(10) Patent No.: US 6,917,565 B2
(45) Date of Patent: Jul. 12, 2005

(54) CLOCKING SYSTEM

(76) Inventor: Kunihiro Kishida, No. 503 Beaazu-Sankei, 1-14-8 Oomorinaka, Oota-ku, Tokyo (JP)

( * ) Notice: Subject to any disclaimer, the term of this patent is extended or adjusted under 35 U.S.C. 154(b) by 226 days.

(21) Appl. No.: 10/458,269

(22) Filed: Jun. 11, 2003

(65) Prior Publication Data

US 2004/0017732 A1 Jan. 29, 2004

(30) Foreign Application Priority Data

Jun. 18, 2002 (JP) ....................................... 2002-176719

(51) Int. Cl.$^{7}$ .......................... G04F 8/00; G04B 47/00; G06K 7/10; G01C 22/00

(52) U.S. Cl. ................................ 368/2; 368/3; 368/10; 324/179; 235/377; 340/323 R; 377/20

(58) Field of Search .................. 368/2, 3, 10; 324/179; 340/323 R; 377/20

(56) References Cited

U.S. PATENT DOCUMENTS

| | | | | | |
|---|---|---|---|---|---|
| 3,609,678 | A | * | 9/1971 | Fayling | 340/905 |
| 4,392,122 | A | * | 7/1983 | Hocken | 340/323 R |
| 4,823,367 | A | * | 4/1989 | Kreutzfeld | 377/24.2 |
| 5,090,030 | A | * | 2/1992 | Jenkins | 377/5 |
| 5,138,589 | A | * | 8/1992 | Kimbel | 368/6 |
| 5,241,487 | A | * | 8/1993 | Bianco | 702/178 |
| 5,491,476 | A | * | 2/1996 | DiBella | 340/933 |
| 5,511,045 | A | * | 4/1996 | Sasaki et al. | 368/2 |
| 5,737,280 | A | * | 4/1998 | Kokubo | 368/2 |

* cited by examiner

*Primary Examiner*—Randy Gibson
*Assistant Examiner*—Jeanne-Marguerite Goodwin
(74) *Attorney, Agent, or Firm*—Oblon, Spivak, McClelland, Maier & Neustadt, P.C.

(57) ABSTRACT

The present invention provides a clocking system such that the magnetic sensor can detect the external magnetic field from the magnetic member that is rather far apart therefrom without increasing the sensitivity of the magnetic sensor excessively and without making the magnet constructing the magnetic member strong excessively.

A clocking system is characterized by comprising: a magnetic member to be installed at a certain place; and a clocking apparatus having a magnetic sensor for detecting a magnetic field and generating a signal; control means for transmitting a control signal when a signal generated by the magnetic sensor corresponds to a magnetic field having a certain strength; clocking means for clocking according to start and termination of clocking on the basis of the control signal; storage means for storing the clocked time; and display means for displaying the stored time, wherein the magnetic member includes a plurality of magnets that are arranged in a line, and the magnets are arranged adjacent with each other in such a manner that the same poles are faced in a certain direction approximately perpendicular to a linear direction in which the magnets are arranged.

2 Claims, 9 Drawing Sheets

CLOCKING SYSTEM

BACKGROUND OF THE INVENTION

1. Field of the Invention

The present invention relates to a clocking system that is provided with a magnetic member to be installed at a certain place and a clocking apparatus having a magnetic sensor and controlling the clocking operation on the basis of an external magnetic field from a magnetic member that is detected by the magnetic sensor.

2. Description of the Related Art

For example, a clocking system having a magnetic member and a magnetic sensor as disclosed in Japanese Patent Application Laying Open (KOKAI) 8-122563 has been conventionally known. In this clocking system, when the magnetic sensor detects a predetermined strength of a magnetic field, namely, when the magnetic sensor detects an external magnetic field from the magnetic member, the start and the termination operation of clocking are controlled. This magnetic member is embedded at a certain place (a start/goal position or a position for measuring a traveling time of a section) of a track of a circuit where a vehicle with the magnetic sensor attached is traveling. The magnetic sensor comprises a hole element and it is attached at a bottom surface of the vehicle. If the vehicle passes through the certain place where the magnetic member is embedded, the magnetic sensor attached to the vehicle may detect the external magnetic field from the magnetic member. On the bases of this detection of the external magnetic field by this magnetic sensor, the start and the termination operation of clocking are controlled so that the traveling time of the vehicle is clocked.

In the case of the magnetic member embedded in the track of the circuit and the magnetic sensor attached to the vehicle traveling on this track disclosed in this patent application, under the normal traveling condition of the vehicle, it is possible to maintain a narrow distance range between the magnetic member and the magnetic sensor. For example, at a normal traveling condition, the magnetic sensor attached to the vehicle can be maintained in a distance range within 15 cm or the like on a surface of the track. If the magnetic sensor is located in a range of a short distance from the magnetic member in this way, the magnetic sensor can detect the external magnetic field from the magnetic member.

However, when the vehicle runs on the obstruction, the vehicle may depart from the surface of the track and this may result in increase of a distance between the magnetic member and the magnetic sensor. Normally, the external magnetic field from the magnetic member may be rapidly decreased in accordance with a distance form the magnetic member. Thus, if a distance between the magnetic member and the magnetic sensor increases, the magnetic sensor cannot detect the external magnetic field from the magnetic member.

In addition, when a target object with the magnetic sensor installed passes through a place where the magnetic member is embedded, the target object to be clocked not may be a vehicle such as an automobile or the like as in the above mentioned patent application but may be a human being in a clocking system for detecting the external magnetic field from the magnetic member and controlling clocking. For example, this may be a case that a lap time of a certain section and a split time or the like of a competitor are clocked at a competition of a track and field completion, soccer, skate and ski or the like, or while practicing them.

In the above described case, since the external magnetic field from the embedded magnetic member does not reach in the distance, the magnetic sensor is needed to pass through the vicinity of the magnetic member as much as possible in order to detect the external magnetic field of the magnetic member. Therefore, for example, it may be considered that the magnetic sensor is attached to the shoes of the competitor so that the magnetic sensor is brought close to the surface of an athletic field such as a track or the like as much as possible. However, in accordance with the operation of the competitor complied with each competition, the shoes of the competitor to which the magnetic sensor is attached may be detached from the surface of the athletic field such as a track or the like. In such a case, a distance between the magnetic member and the magnetic sensor does not remain constant and the magnetic sensor cannot detect the external magnetic field generated by the magnetic member, and as a result, clocking cannot be performed.

There are some kinds of competitions in which a body portion of the competitor, for example, a waist of the competitor is maintained at a relative constant height from the surface of the athletic field. However, in such a competition, in the case that the magnetic sensor attached to, for example, the waist portion of the competitor passing over the magnetic member that is embedded in the athletic field detects the external magnetic field from the magnetic member, the distance between the magnetic member and the magnetic sensor becomes very long. In such a case, the magnetic sensor is forced to detect the external magnetic field from the magnetic member that is far apart therefrom.

As one method for elongating the distance from the magnetic member that can be detected by the magnetic sensor, a method to raise the sensitivity of the magnetic sensor such as a hole element or the like may be considered. However, if the magnetic sensor having a high sensitivity is used, it can easily detect not only the external magnetic field from the magnetic member to be detected but also the external magnetic field from other members located in a measurement environment. Therefore, a signal on the basis of the magnetic field from other members is also generated, so that the clocking control on the basis of the detection of the external magnetic field from the magnetic member by the magnetic sensor cannot be performed. Accordingly, by using the magnetic sensor having too high sensitivity, it is not possible to perform clocking reliably.

In addition, as an another method, a method may be considered such that a magnetic member is made by a strong magnet so as to make the external magnetic field from the magnetic member stronger. However, if the strong magnet is used, the magnetic members are attracted or repelled with each other by a strong force, or the magnetic members strongly attract various materials including a magnetic body. As a result, risk upon manufacturing such a magnetic member and risk upon installation or removal of such a magnetic member may increase. In addition, when the strong magnet is used, this has a problem such that the magnetic member becomes expensive.

In a clocking system provided with a magnetic member installed at a certain place and a clocking apparatus for controlling the clocking operation on the basis of an external magnetic field from a magnetic member that is detected by a magnetic sensor, there is a problem such that this clocking system should be constructed so that the magnetic member is installed movably in addition to a problem such that a distance from the magnetic member that the above described magnetic sensor can detect should be made longer.

In the other words, the magnetic member is embedded in the track to be clocked and the embedded position is fixed.

However, in order to use the clocking system for various applications, it is preferable that the magnetic member can be installed movably and the magnetic member is installed at a required position, in a required competition, and at a required time to clock.

As an aspect of such a movable magnetic member, it may be considered that the magnetic member is not embedded in the track but it is installed under the condition that the magnetic member is upreared. In this mode, the upreared magnetic member is installed freely and movably at a certain place. In this case, the magnetic sensor attached to the competitor passing through a side of the upreared magnetic member may detect the external magnetic field from the upreared magnetic member. In this mode, if the distance from the magnetic member that can be detected by the magnetic sensor is short, the competitor should pass through the edge of the side of the magnetic member. Therefore, the competitor is forced to have an unnatural posture upon passing through the side of the magnetic member. Such an unnatural posture forced to the competitor has an adverse effect on the competition itself and this is removed from an original purpose such that the passing time at the competition is clocked. In addition, due to this unnatural posture and the crash into the magnetic member, the competitor to be clocked may even be in danger.

Also in the case of constructing the magnetic member that is movably installed as being upreared, it is necessary for a detectable distance of the external magnetic field from the magnetic member by the magnetic sensor to be longer.

A clocking system has been desired such that the magnetic sensor can detect the external magnetic field from the magnetic member that is rather far apart therefrom without increasing the sensitivity of the magnetic sensor excessively and without making the magnet constructing the magnetic member strong excessively. Further, in such a clocking system, it has been desired that the magnetic member can be installed movably.

SUMMARY OF THE INVENTION

The present invention has been made taking the problems into consideration and an object of which is to provide a clocking system for various applications such that the magnetic sensor can detect the external magnetic field from the magnetic member that is rather far apart therefrom without increasing the sensitivity of the magnetic sensor excessively and without making the magnet constructing the magnetic member strong excessively.

According to a first aspect of the invention, a clocking system is characterized by comprising a magnetic member to be installed at a certain place; and a clocking apparatus having a magnetic sensor for detecting a magnetic field and generating a signal; control means for transmitting a control signal when a signal generated by the magnetic sensor corresponds to a magnetic field having a certain strength; clocking means for clocking according to start and termination of clocking on the basis of the control signal; storage means for storing the clocked time; and display means for displaying the stored time, wherein the magnetic member includes a plurality of magnets that are arranged in a line, and the magnets are arranged adjacent with each other in such a manner that the same poles are faced in a certain direction approximately perpendicular to a linear direction in which the magnets are arranged.

By arranging the magnets of the magnetic member adjacent with each other so that the same poles are faced in a certain direction approximately perpendicular to a linear direction in which the magnets are arranged, the external magnetic field from the magnetic member can reach rather in the farther distance and the magnetic sensor can detect the external magnetic field from the magnetic member that is rather far apart therefrom. This structure results in making it possible that degree of freedom in arranging the magnetic sensor and the magnetic member in the clocking system becomes great and the clocking system capable of being applied variously is realized. Particularly, even in the case that a target object to be clocked is a human being, it is possible to provide a clocking system capable of clocking in a natural movement.

According to a second aspect of the invention, it is characterized in that the magnetic member is installed movably.

To arrange the magnetic member movably makes it possible to clock at a required position, in a required competition, and at a required time. By combining this structure that the magnetic member can be installed movably with the structure that the magnetic sensor can detect the external magnetic field from the magnetic member that is rather far apart therefrom, more various applications can be possible.

Further objects and advantages of the present invention will be apparent from the following description of the preferred embodiments of the invention as illustrated in the accompanying drawings.

DESCRIPTION OF THE PREFERRED EMBODIMENTS

Figure 1:
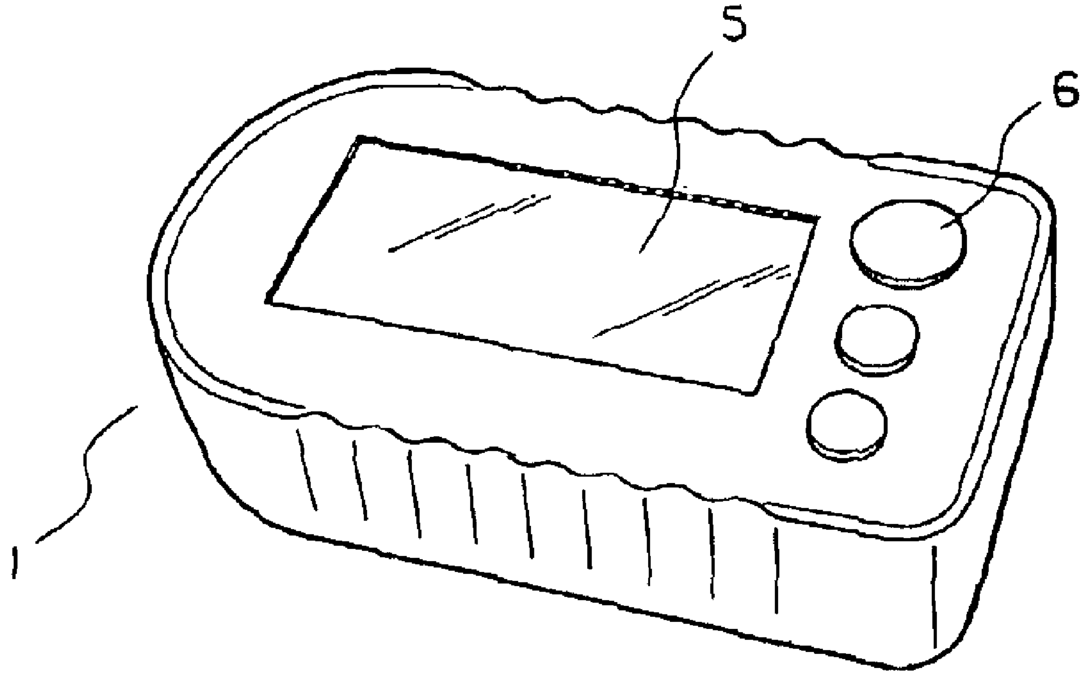
FIG. 1 is an external perspective view of a clocking apparatus of a clocking system according to the present invention.
Figure 2:
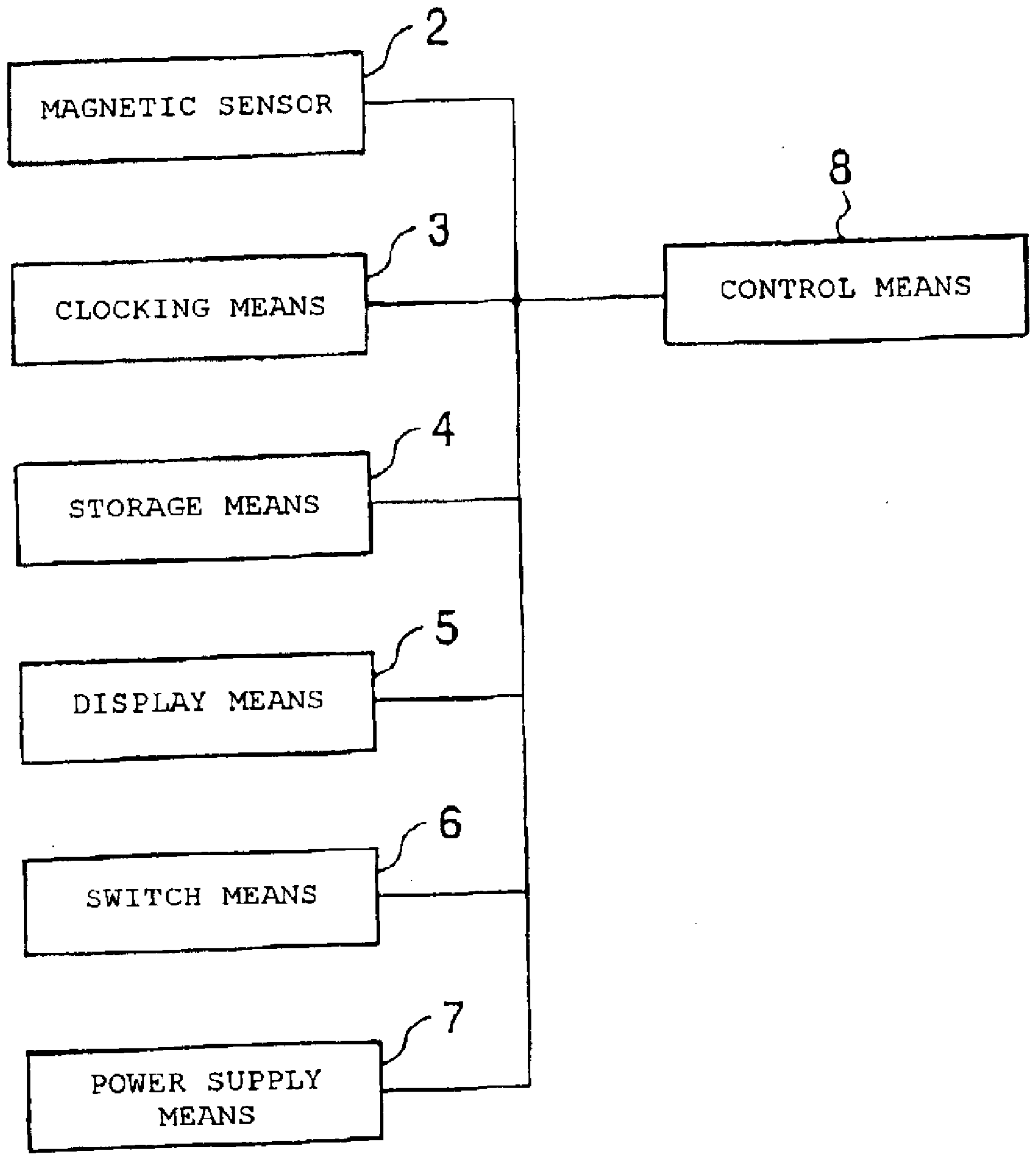
FIG. 2 is a block diagram for showing a structure of the clocking apparatus.

FIG. 1 is an external perspective view of a clocking apparatus 1 of a clocking system 1 according to the present invention. FIG. 2 is a block diagram for showing a structure of the clocking apparatus 1.

The clocking apparatus 1 shown in FIG. 1 is at its outside provided with, for example, display means 5 as a liquid crystal display and switch means 6 for turning on/off a power source, initial settings and selecting the data displayed on the display means 5 or the like.

Further, the clocking apparatus 1 is provided with each means shown in FIG. 2.

Control means 8 is connected to each means 2 to 7 that are provided to the clocking apparatus 1 and it controls the operations of respective means 2 to 7. For example, the magnetic sensor 2 is a hole element and it generates a signal in accordance with the detected magnetic field. This signal is transmitted to the control means 8 and the control means 8 transmits a control signal to the clocking means 3 when the transmitted signal indicates a magnetic field more than a predetermined strength. Then, the clocking means 3 performs clocking according to the start and the termination of clocking on the basis of the reception of the transmitted control signal. The time clocked by the clocking means 3 is transmitted to the storage means 4. Then, the storage means 4 stores this transmitted time. The display means 5 displays the time that is stored in the storage means 4 or display the other predetermined one in accordance with the time to be displayed that is selected by the switch means 6. The clocking can be carried out, for example, at a degree of accuracy, 1/1000 second, and the time display according to the display means 5 can be carried out, for example, at a degree of accuracy, 1/100 second. For example, the power supply means 7 is a battery and it supplies the necessary electric power to respective means 2 to 7 under the control by the control means 8.

The clocking apparatus 1 is structured compact and lightweight so that the competitor can play a game without consciousness that he or she is attached with the clocking apparatus 1 and the clocking apparatus 1 does not have an influence on the competition as much as possible.

When using the clocking apparatus 1 according to the present invention to perform clocking, at first, the clocking apparatus 1 is prepared to turn on the power supply of the clocking apparatus 1 by the switch means 6. In the next place, an environment is measured at a measurement place so that the magnetic sensor 2 is not affected by the magnetism other than that from the magnetic member and then, initial settings with regard to the sensitivity of the magnetic sensor 2 is carried out. After that, the magnetic member is arranged at a certain measurement place and the clocking apparatus 1 is installed on the target object to be clocked, for example, the competitor. This results in completion of preparation for performing clocking.

In the case that a single magnetic member is installed at a race track, when the competitor being attached with the clocking apparatus 1 having the magnetic sensor 2 passes through the place where this magnetic member is installed at first time, the external magnetic field from the magnetic member corresponding to the magnetic field having a predetermined strength is detected by the magnetic sensor 2 to start clocking. When the competitor passes through this place in the next place, the external magnetic field from the magnetic member corresponding to the magnetic field having a predetermined strength is detected by the magnetic sensor 2 to terminate clocking, and then, the passage time of a full circle is clocked. The competitor passes through the place where the magnetic member is installed while going around a track for several times, and this results in making possible to clock a lap time for each circle of the track.

If the magnetic members are installed at two places of the track, for example, a start position for starting the clocking and a goal position for terminating the clocking, respectively, it is possible to clock the passage time between the start position and the goal position.

In addition, if a plurality of magnetic members is installed at a position within a predetermined section of the track, it is possible to clock a split time of the competitor passing through this predetermined section.

According to the clocking system structure for controlling the start and the termination of the clocking on the basis of the detection of the external magnetic field from the magnetic member by the magnetic sensor by combining this magnetic member with the magnetic sensor, there are some advantages as follows. Namely, the magnetic member does not require the power source, the maintenance of the magnetic member is not required, the detection of the external magnetic field from the magnetic member by using the magnetic sensor is not influenced by weather, the clocking does not require an assistant, the competitor himself or herself can clock various times (a lap time and a split time or the like), the clocking can be carried out independent whether or not a person is present at the track in addition to the competitor, and the accurate clocking can be performed when the competitor merely passes through the place where the magnetic member is installed after turning on the clocking apparatus to perform predetermined initial settings.

Figure 3:
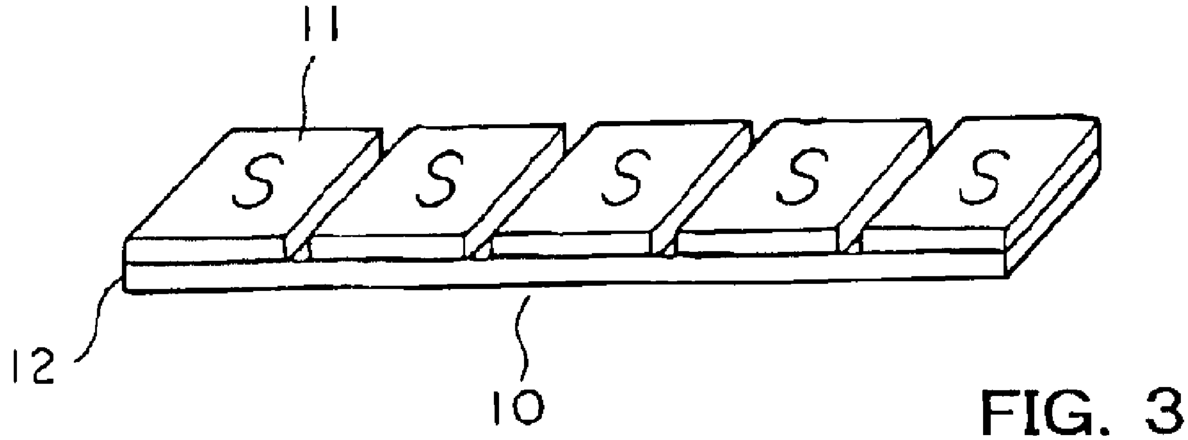
FIG. 3 illustrates an example of a magnetic member according to the clocking system of the present invention.

FIG. 3 illustrates an example of a magnetic member 10 according to the clocking system of the present invention.

The magnetic member 10 shown in FIG. 3 is a magnetic member 10 of a type embedded in an athletic field, for example, a track. This magnetic member 10 may include a plurality of magnets 11 arranged in a line made of, for example, neodymium. The magnets 11 are arranged adjacent with each other so that the same poles are faced in a certain direction approximately perpendicular to a linear direction in which these magnets are arranged. In other words, according to the example shown in FIG. 3, the magnets 11 are arranged adjacent with each other so that their south poles are faced to the opposite side of a substrate 12 along a longitudinal direction of the substrate 12. In other words, in FIG. 3, a face of the magnet 11 facing to the substrate 12 is a north pole. The arranged magnets 11 are fixed to the substrate 12 by an adhesive agent or mechanical fixing means and they are coated by rubbers or the like (not illustrated) In FIG. 3, the magnets 11 are arranged with spaces therebetween in order to make the drawing easy to understand, however, in fact, the magnets 11 are arranged in an almost contacted state to each other. The magnets 11 are embedded in a direction crossing over the track in accordance with a necessary width of the track to be clocked.

Figure 4A:
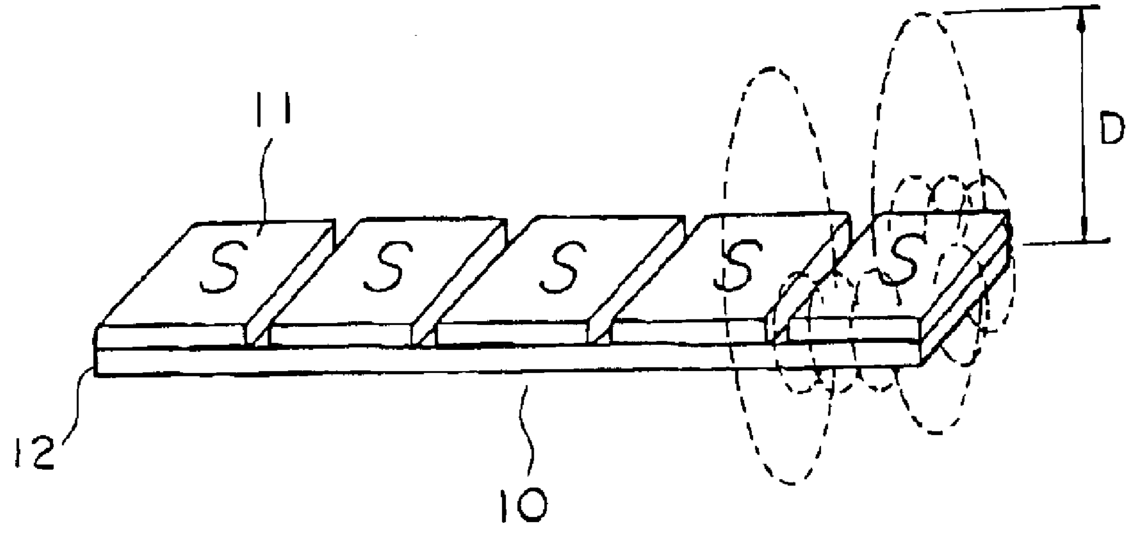
FIG. 4A is a typical view of a magnetic flux.
Figure 4B:
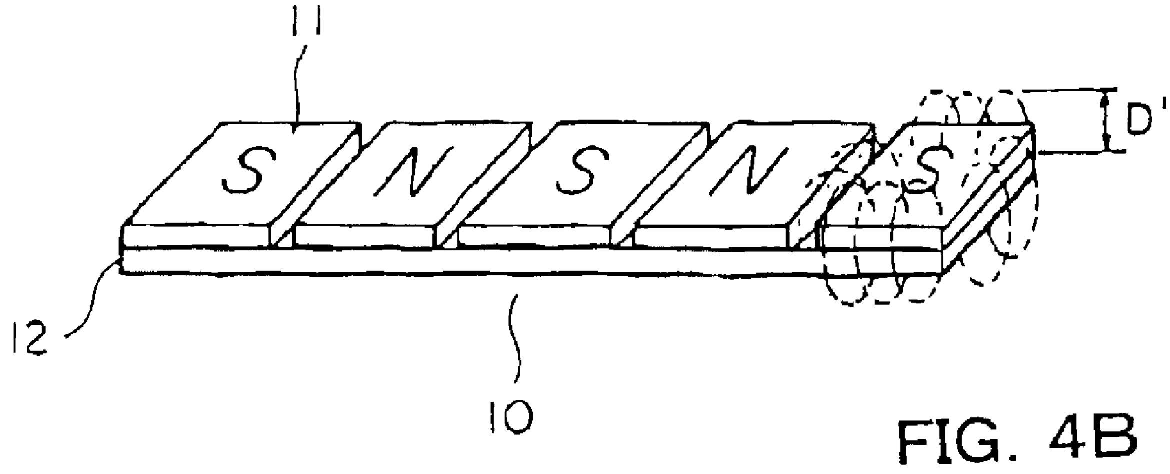
FIG. 4B is a typical view of a magnetic flux.

FIG. 4A and FIG. 4B are typical views of a magnetic flux from the magnet member 10.

FIG. 4A is a typical view of a magnetic flux in the case that the magnets 11 are arranged adjacent with each other so that the same poles are faced in a certain direction approximately perpendicular to a linear direction in which these magnets are arranged. FIG. 4B is a typical view of a magnetic flux in the case that the magnets 11 are arranged adjacent with each other so that the poles are alternately counter changed in a certain direction approximately perpendicular to a linear direction in which these magnets are arranged. In this case, the substrate 12 is made of a material having a high magnetic permeability such as iron.

In the arrangement of the magnets 11 in FIG. 4A, it is shown that the magnetic fluxes in the vicinity of a boundary between the magnets 11 are elongated far off to the outside. In FIG. 4A, D shows a range of the magnetic flux expanding from the surface of the magnetic member 10 to the outside.

In the arrangement of the magnets 11 in FIG. 4B, it is shown that the magnetic fluxes in the vicinity of a boundary between the magnets 11 are elongated to the adjacent magnet 11 of the opposite pole and there is no magnetic flux elongated far off to the outside. In FIG. 4B, D' shows a range of the magnetic flux expanding from the surface of the magnetic member 10 to the outside.

According to a certain example, the arrangement of the same magnets 11 is changed as shown in the above described FIG. 4A and FIG. 4B, and this results in making possible to make D four times as much as D'. According to an example, by arranging the magnets 11 adjacent with each other so that the same poles are faced in a certain direction approximately perpendicular to a linear direction in which the magnets are arranged, it is possible to make a distance from the magnetic member capable of being detected by the magnetic sensor 2 as a normal hole element in the range of 90 cm to 150 cm. By such a long distance range, a degree of freedom with regard to the arrangement of the magnetic sensor and the magnetic member becomes great, so that a clocking system for various applications can be realized. Particularly, it is possible to provide a clocking system capable of clocking even in the case that a target object to be clocked is a human being.

Figure 5:
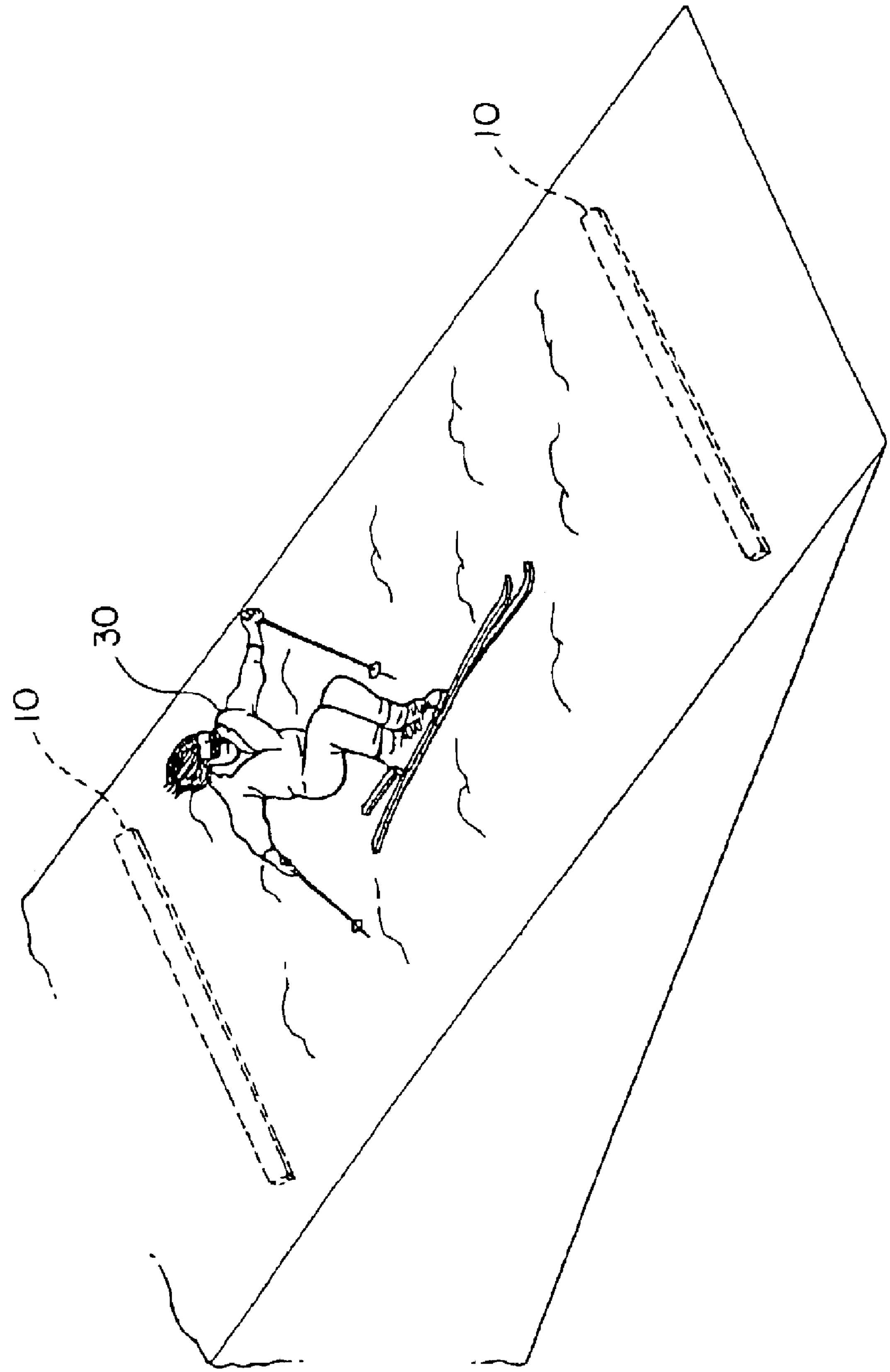
FIG. 5 illustrates an embodiment of the clocking system of the present invention that is applied to a ski competition.

FIG. 5 illustrates an embodiment of the clocking system of the present invention that is applied to a ski competition.

In FIG. 5, the magnetic member 10 is embedded in certain two places of a ski competition course (for example, a start position and a goal position) . A competitor 30 is attached with the clocking apparatus 1 on ski boots, a ski, or a portion of skiwear. The magnetic sensor 2 provided to the clocking apparatus 1 that is mounted on the competitor 30 can detect the external magnetic field from the magnetic member 10 if it is located in the range of, for example, 90 cm to 150 cm from the embedded magnetic member 10.

If the competitor 30 passes over the magnetic member 10 that is embedded in the start position, the magnetic sensor 2 of the clocking apparatus 1 that is mounted on the competitor 30 detects the external magnetic field having a predetermined strength from the magnetic member 10 at the start position to automatically start the clocking. When the competitor 30 passes over the magnetic member 10 at the goal position, the magnetic sensor 2 of the clocking apparatus 1 that is mounted on the competitor 30 detects the external magnetic field having a predetermined strength from the magnetic member 10 at the goal position to automatically terminate the clocking. Accordingly, the passage time between the start position and the goal position may be clocked. At these positions, the competitor 30 hardly performs the operation that he or she detaches himself or herself from the surface of the course, and resulting in making possible the magnetic sensor 2 to sufficiently detect the external magnetic field from the magnetic member 10.

Figure 6:
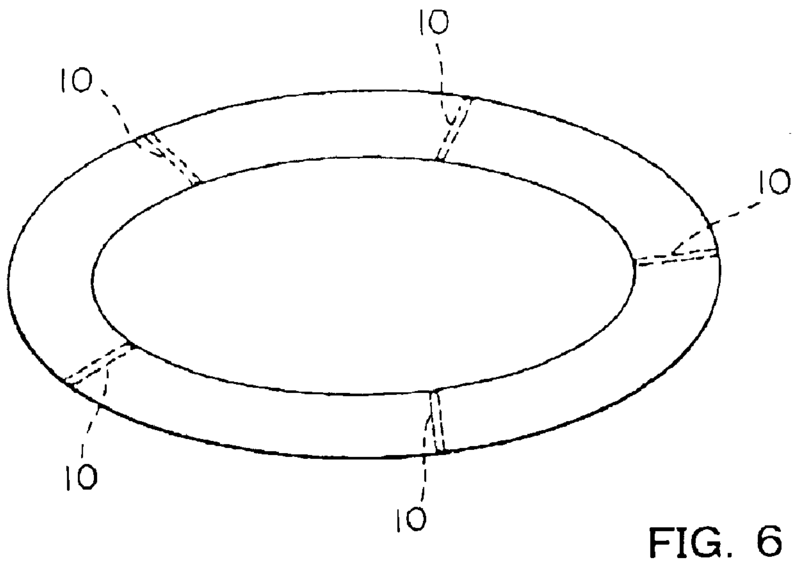
FIG. 6 illustrates an embodiment of the clocking system according to the present invention that is applied to a skating competition.

FIG. 6 illustrates an embodiment of the clocking system according to the present invention that is applied to a skating competition.

According to the embodiment shown in FIG. 6, a plurality of magnetic members 10 is embedded in a skating rink. The competitor 30 is attached with the clocking apparatus 1 on skate boots or a portion of skatewear. According to the embodiment shown in FIG. 6, each time when the competitor 30 passes over the embedded plural magnetic members 10, the magnetic sensor 2 of the clocking apparatus 1 mounted on the competitor detects the external magnetic field from the magnetic member 10 to perform the control operation of clocking. This makes possible to obtain the data such as the split time for each section in which the magnetic member 10 is embedded.

Figure 7A:
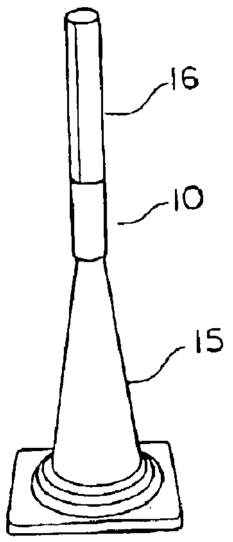
FIG. 7A illustrates an embodiment of movably installing the magnetic member as it is upreared.
Figure 7B:
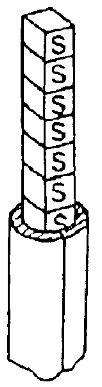
FIG. 7B illustrates the magnetic member shown in FIG. 7A from which a portion of external case thereof is removed.

FIG. 7A and FIG. 7B illustrate an embodiment of movably installing the magnetic member 10 as it is upreared.

The magnetic member 10 shown in FIG. 7A is arranged on a cone 15 to be installed movably at a certain place that should be clocked. A cap 16 is attached on the magnetic member 10 as a land mark. The height of the magnetic member 10 is installed in the range including approximately same height as that of the clocking apparatus 1 that is worn by the competitor 30.

FIG. 7B illustrates the magnetic member shown in FIG. 7A from which a portion of external case thereof is removed. In FIG. 7B, a plurality of magnets 10 are shown, which are arranged adjacent with each other so that the poles are faced in a certain direction approximately perpendicular to a linear direction in which these magnets are arranged. In fact, these magnets 11 are installed as being contained in a case made of aluminum. The cap 16 is provided with a mark 17 showing a direction in which the magnetic field of the magnet 10 that is included therewithin is elongated.

Figure 8A:
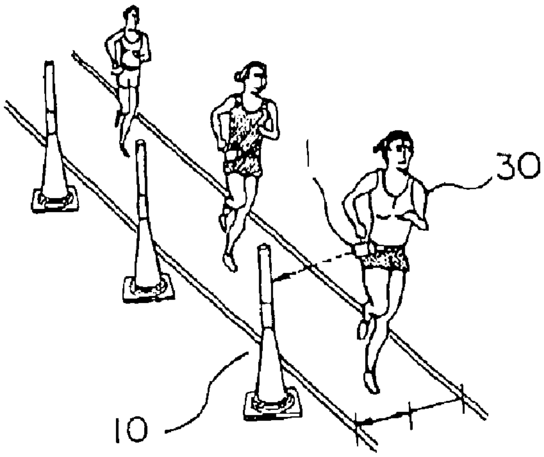
FIG. 8A illustrates a competitor passing through a side of the magnetic member shown in FIG. 7A while being attached with the clocking apparatus.

FIG. 8A illustrates the competitor 30 passing through the side of the magnetic member 10 shown in FIG. 7A while being attached with the clocking apparatus 1. If the competitor 30 passes through the side of the magnetic member 10, for example, in the range of distance of 90 cm to 150 cm, the magnetic sensor 2 of the clocking apparatus 1 worn by the competitor 30 may detect the external magnetism from the magnetic member 10. On the basis of the detection of the external magnetism from the magnetic member 10 by this magnetic sensor 2, the clocking operation may be controlled. In such a range of distance, the competitor 30 is not forced to have an unnatural posture upon passing through the side of the magnetic member 10 and the competitor 30 is not in danger of crashing into the magnetic member 10.

Figure 8B:
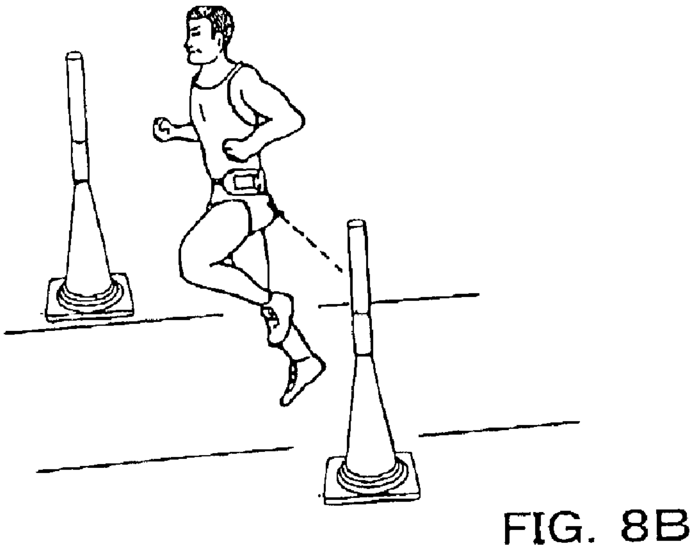
FIG. 8B illustrates an example in which the magnetic member is installed at both sides of a track.

FIG. 8B illustrates an example in which the magnetic member 10 is installed at both sides of the track.

Figure 8C:
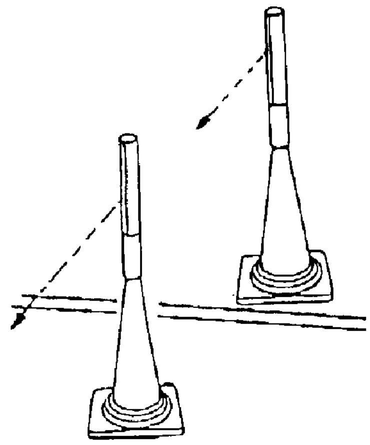
FIG. 8C illustrates an example in which the magnetic member is installed at both sides of a track.

In the case that a single magnetic member 10 shown in FIG. 8A is installed, the competitor 30 has to pass through in the rage of distance of 90 cm to 150 cm from the side of the magnetic member 10, so that the competition result of the competitor 30 is influenced since he or she can not help being conscious of a distance between the competitor and the magnetic member 10. Alternatively, when the competitor 30 concentrates on the competition, he or she may detach himself or herself from the magnetic member 10 outside of the range of distance in which the magnetic member 10 can detect the magnetic field. On the contrary, as shown in FIG. 8B and FIG. 8C, to install the magnetic member 10 at both sides of track in the same direction is preferable since the magnetic field is further elongated and resulting in making possible to further elongate the distance between the magnetic members 10.

Figure 9A:
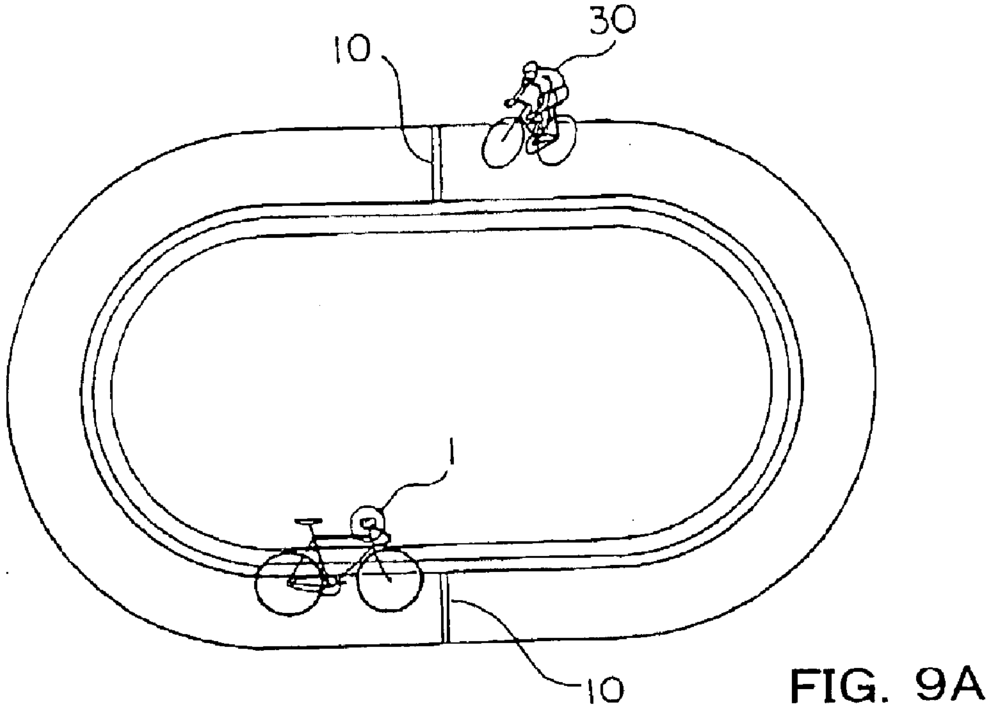
FIG. 9A illustrates another embodiment in which the magnetic member can be movably installed.

FIG. 9A illustrates another embodiment in which the magnetic member 10 can be movably installed. This embodiment represents the clocking system for clocking a passage time, a rap time and a split time or the like of a bicycle on a race track in a bicycle competition.

Figure 9B:
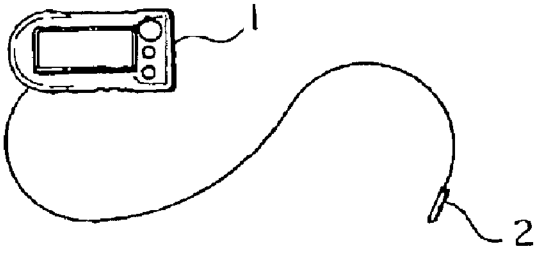
FIG. 9B illustrates the connection between the clocking apparatus and the magnetic sensor through the cable.

As shown in FIG. 9A, a thin magnetic member 10 is movably installed on the race track on which the bicycle is travelling, the clocking apparatus 1 is mounted on a handle bars of the bicycle, and the magnetic sensor 2 is pulled out from the clocking apparatus 1 to be mounted in the vicinity of a gear portion of the bicycle. As shown in FIG. 9B, the magnetic sensor 2 to be installed and the clocking apparatus 1 of the handle bars are connected through a cable. The magnetic sensor 2 is installed on one of pedals of the bicycle and this makes it possible to reduce a distance from the magnetic member 10 that is movably installed on the race track.

Figure 9C:
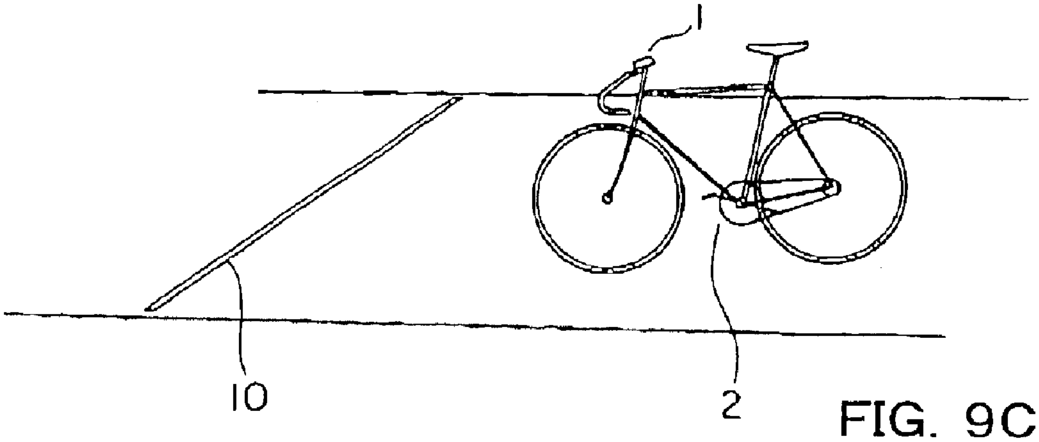
FIG. 9C illustrates a relation between the magnetic member, the magnetic sensor, and the clocking apparatus.

If the bicycle that is provided with the clocking apparatus 1 passes over the magnetic member 10 that is movably installed on the race track, the magnetic sensor 2 that is installed at the pedal of the bicycle detects the external magnetic field from the magnetic member 10 to transmit its detection signal to the clocking apparatus 1 through the cable. Then, the clocking apparatus 1 may perform the control operation of clocking on the basis of the detection signal of the magnetic field that is transmitted through the cable. FIG. 9C illustrates a relation between the magnetic member 10, the magnetic sensor 2, and the clocking apparatus 1.

Figure 9D:
FIG. 9D is a cross sectional view of the magnetic member.

FIG. 9D is a cross sectional view of the magnetic member 10 to be employed in this embodiment.

The magnetic member 10 according to the present embodiment is made into a thin type having a very slight slope. In other words, for example, a height is 3.2 mm with regard to a width of 50 mm. As same as the magnetic member 10 shown in FIG. 3, for example, this magnetic member 10 includes a neodymium magnet 11 of 2.2 mm thick on the substrate 12 as iron of 0.3 mm thick and the substrate 12 and the magnet 11 are coated with a rubber.

Such a thin magnetic member having a very slight slope has little influence in the bicycle competition due to the existence of the magnetic member 10 on the bicycle passing over the magnetic member 10. In addition, the substrate 12 can supply the mechanical strength on the magnetic member 10, so that, even if the bicycle passes over the magnetic member 10, the magnetic member 10 can overcome the distortion due to the weight of the passing bicycle and the competitor. Further, even if the repelling magnets 11 are firmly fixed on the substrate 12, the distortion of the magnetic member 10 is prevented by a force of repulsion of the magnets 11. In addition, the rubber coating can protect the magnetic member 10 from the external environment. Further, when the magnetic members 10 come close to each other to be firmly fixed with each other, the magnetic members 10 are prevented from being directly contacted with each other due to this coating, and this results in making it possible to detach the magnetic members 10 with each other.

Further, it is possible to freely select the material, the shape, and the size of the substrate 12, the magnet 11, and the coating depending on use application. In addition, a length in a longitudinal direction of the magnetic member 10 is about 1 m so that the magnetic member 10 can be easily carried and stored. These magnetic members 10 are installed at a necessary place by a necessary number for crossing over the track of the competition to be clocked in a line. In the case of clocking at another place, these magnetic members 10 may be moved to a desired place. In addition, if the clocking is terminated and the magnetic members 10 become unnecessary, these magnetic members 10 can be removed.

In addition, by aligning these plural magnetic members 10 on a sloped surface or an uneven surface, it is possible to perform clocking even in a cross-country competition or the like that is performed at an uneven place.

Figure 10:
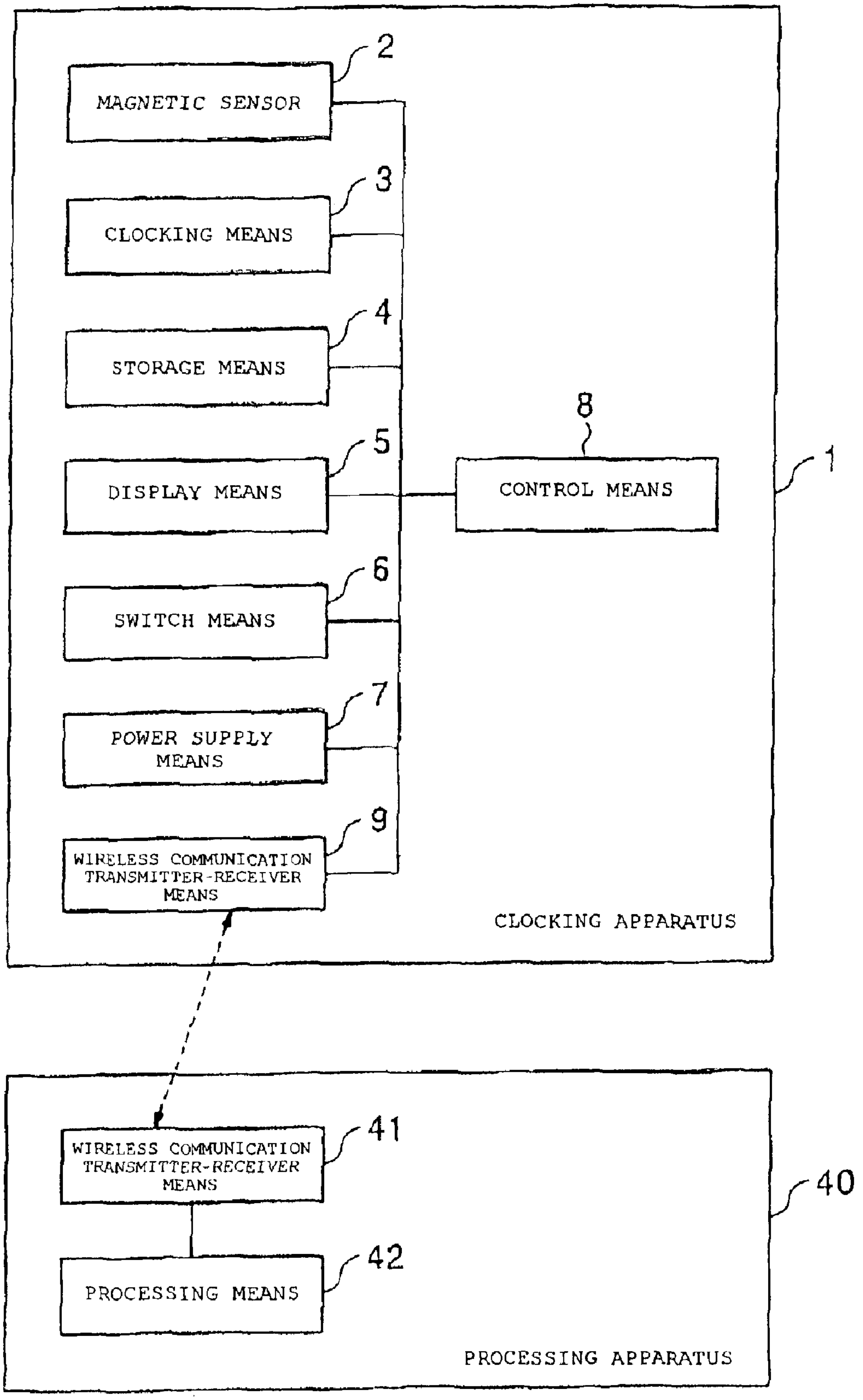
FIG. 10 illustrates an embodiment in which the clocking apparatus is provided with wireless communication transmitter-receiver means.

FIG. 10 illustrates an embodiment in which the clocking apparatus 1 is provided with wireless communication transmitter-receiver means 9.

The wireless communication transmitter-receiver means 9 that is provided to the clocking apparatus 1 can transmit the clocking data that is clocked by the clocking means 3 to a processing apparatus 40 by wireless. Wireless transmitter-receiver means 41 that is provided to the processing apparatus 40 receives the transmitted clocking data. Processing means 42 that is provided to the processing apparatus 40 can record the received clocking data or can variously perform processes by using this clocking data. For example, the processing means 42 can produce the data such as a rap time and a split time or the like from the clocking data on the basis of the detection of the magnetic sensor 2 of the external magnetic field from the installed plural magnetic members 10 or the processing means 42 can produce the time history data of the same competitor. Further, by giving specific identification data to the clocking apparatus 1 and transmitting the identification data together with the clocking data, it is also possible to obtain the clocking data of a plurality of competitors at the same time.

The processed data that is processed by the processing means 42 also can be transmitted to the clocking apparatus 1 through the wireless transmitter-receiver means 41 of the processing apparatus 40. The clocking apparatus 1 also can display the processed data that is transmitted from the processing apparatus 40 on the display means 5.

According to the clocking system of the present invention, the magnetic member installed at a certain place includes a plurality of magnets that are arranged in the line and by arranging the magnets of the magnetic member adjacent with each other so that the same poles are faced in a certain direction approximately perpendicular to a linear direction in which the magnets are arranged, the external magnetic field from the magnetic member can reach rather in the farther distance and the magnetic sensor can detect the external magnetic field from the magnetic member that is rather far apart therefrom. This structure results in making it possible that degree of freedom in arranging the magnetic sensor and the magnetic member in the clocking system becomes great and the clocking system capable of being applied variously is realized. Particularly, even in the case that a target object to be clocked is a human being, it is possible to provide a clocking system capable of clocking in a natural movement.

Many widely different embodiments of the present invention may be constructed without departing from the spirit and scope of the present invention. It should be understood that the present invention is not limited to the specific embodiments described in the specification, except as defined in the appended claims.

What is claimed is:

1. A clocking system characterized by comprising:

a magnetic member to be installed at a certain place; and a clocking apparatus having a magnetic sensor for detecting a magnetic field and generating a signal;

control means for transmitting a control signal when a signal generated by said magnetic sensor corresponds to a magnetic field having a certain strength;

clocking means for clocking according to start and termination of clocking on the basis of said control signal;

storage means for storing the clocked time; and
display means for displaying the stored time, wherein said magnetic member includes a plurality of magnets that are arranged in a line, and said magnets are arranged adjacent with each other in such a manner that the same poles are faced in a certain direction approximately perpendicular to a linear direction in which the magnets are arranged.

2. The clocking system according to claim 1, characterized in that said magnetic member is installed movably.

* * * * *